US012726287B2

(12) United States Patent
Chongoushian

(10) Patent No.: US 12,726,287 B2
(45) Date of Patent: Sep. 1, 2026

(54) SPLIT TIME DIVISION MULTIPLE ACCESS NETWORK DETECTOR

(71) Applicant: BAE SYSTEMS Information and Electronic Systems Integration Inc., Nashua, NH (US)

(72) Inventor: John H. Chongoushian, Emerson, NJ (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 118 days.

(21) Appl. No.: 18/819,105

(22) Filed: Aug. 29, 2024

(65) Prior Publication Data

US 2026/0067015 A1 Mar. 5, 2026

(51) Int. Cl.
*H04J 3/06* (2006.01)

(52) U.S. Cl.
CPC .................................. *H04J 3/0652* (2013.01)

(58) Field of Classification Search
CPC ......... H04J 3/0652; H04J 3/06; H04W 56/00; H04L 7/0016; H04B 7/2125
USPC ........ 370/350, 321, 337, 347, 442; 455/208, 455/265, 13.2, 502
See application file for complete search history.

(56) References Cited

U.S. PATENT DOCUMENTS 9,312,977 B1 4/2016 Khuu et al.
9,948,383 B1 * 4/2018 Thommana .......... H04B 7/2671
2005/0063419 A1 * 3/2005 Schrader ............. H04W 40/248 370/466
2008/0008138 A1 1/2008 Pun
2008/0043663 A1 * 2/2008 Youssefzadeh .... H04B 7/18528 370/321
2014/0177656 A1 6/2014 Mian et al.
2020/0205172 A1 6/2020 Elliott et al.

OTHER PUBLICATIONS

International Search Report, PCT/US25/42748, mailed Nov. 4, 2025, 10 pages.

* cited by examiner

*Primary Examiner* — Michael Y Mapa
(74) *Attorney, Agent, or Firm* — Maine Cernota & Curran; Gary McFaline

(57) ABSTRACT

A node of a first TDMA network, such as a link 16 network, uses a first receiver to participate in the first network, while using a second receiver to detect and report a second TDMA network, which is not synchronized with the first network, by listening for a characteristic message from the second TDMA network. The timing error between the networks can be estimated from the received message timing. Upon detection, the node can join the second network and/or request updated timing information from the second network. In embodiments where timeslot-specific TRANSEC filters are required, the node selects a TRANSEC filter for a timeslot that is further in the future than an estimated timing error bound. The first and second networks can implement the same network protocol and architecture, differing only due to the timing offset between their network timing references, as would be the case for a split network.

18 Claims, 5 Drawing Sheets

| | | | | | | | | | | | | | | | | | | | | | | | | | |
|---|---|---|---|---|---|---|---|---|---|---|---|---|---|---|---|---|---|---|---|---|---|---|---|---|---|
| TDMA 1 Slot # (200) | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
| Data Type (202) | UD | UD | UD | UD | UD | UD | UD | UD | UD | UD | UD | NE | UD | UD | UD | UD | UD | UD | UD | UD | UD | UD | UD | NE | UD |
| Receiver 1 TRANSEC (204) | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |

| | | | | | | | | | | | | | | | | | | | | | | | | | |
|---|---|---|---|---|---|---|---|---|---|---|---|---|---|---|---|---|---|---|---|---|---|---|---|---|---|
| TDMA 2 Slot # (300) | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 |
| Receiver 2 TRANSEC (302) | 24 | | | | | | | | | | | | | | | | | 25 | 26 | 27 | 28 | 29 | 30 | 31 | 32 |

SPLIT TIME DIVISION MULTIPLE ACCESS NETWORK DETECTOR

FIELD

The disclosure relates to Time Division Multiple Access (TDMA) networks, and more particularly to detection and characterization by a first TDMA network of a second TDMA network without time synchronization therebetween.

BACKGROUND

Time Division Multiple Access (TDMA) networks require precise timing synchronization of the nodes. One approach is to synchronize all of the nodes to a network time reference, which can be one of the nodes acting as the network time reference, or an external network time reference used by all nodes in the network as a common time base. However, if access to a network time reference is not readily available to all nodes at all times, it becomes necessary for each of the nodes to maintain its own internal time base, and for the network to maintain synchronization between the network time reference and the internal time bases of the nodes to within a small percentage of the timeslot width.

If two networks are operating according to the same TDMA architecture, but the two TDMA networks are not time-synchronized, it can be difficult for them to detect and characterize each other, even if they would otherwise be able to intercommunicate. This can occur, for example, when a TDMA network is "split" into two networks, for example due to physical separation between two groups of nodes, causing their network time references to drift out of synchronization with each other. If this timing drift becomes larger than the width of a time slot, it can be difficult for the two split TDMA networks to intercommunicate, or even to detect each other, despite moving back into mutual communication range. This difficulty is increased if the TDMA networks implement a Transmission Security (TRANSEC) feature, such as frequency "hopping" of the time slots (for wireless nodes) and/or application of pseudo-random noise.

What is needed, therefore, is a node of a first TDMA network that is configured to recognize and characterize a second TDMA network when no common network time reference is available to both of the TDMA networks, and when the network time references of the two TDMA networks are not synchronized with each other.

SUMMARY

The present disclosure is a node of a first TDMA network, such as a link 16 network, that is configured to recognize and characterize a second TDMA network when no common network time reference is available, and when the network time references of the two TDMA networks are not synchronized with each other.

The disclosed node includes a transmitter, a first receiver, a second receiver, a first internal time base that is synchronized with a network time reference of the first TDMA network, and a controller. The second TDMA network implements a TDMA protocol and architecture that are known to the disclosed node, wherein there is an initially unknown timing offset between the network time references of the first and second TDMA networks.

The transmitter and first receiver are used by the controller to participate in the first TDMA network, while the second receiver listens for a network characteristic message transmitted by the second TDMA network. Upon receiving, recognizing, and interpreting the network characteristic message, the disclosed node reports detection of the second TDMA network, for example to a user or to a network manager.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

FIG. 3 is a timing chart that illustrates activities of the two receivers of the node of FIG. 1 when the network characteristic message of the second TDMA network is detected by the second receiver, according to an embodiment of the present disclosure;

DETAILED DESCRIPTION

Disclosed herein is a network node that is configured to participate in a first TDMA network, while simultaneously detecting a second TDMA network that is implementing a known TDMA architecture, but operating according to a network time reference that is not synchronous with the network time reference of the first TDMA network. It will be understood that the "network time reference" of a TDMA network refers to the reference time with which all of the internal time bases of the nodes of the network are synchronized, typically to within a small fraction of the timeslot width of the TDMA network.

Figure 1:
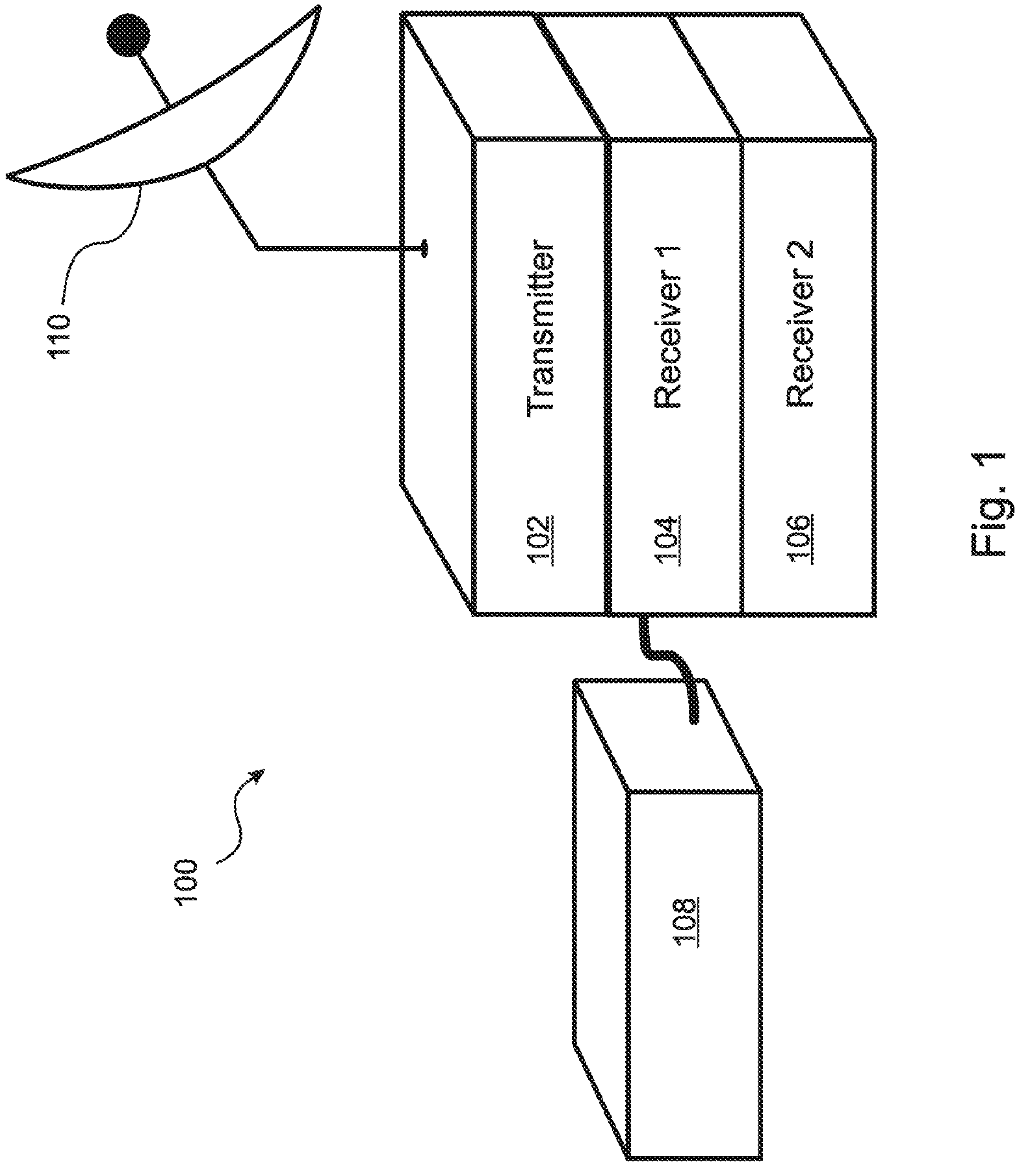
FIG. 1 is a block diagram of a node having two receivers, according to an embodiment of the present disclosure.

With reference to FIG. 1, according to the present disclosure, the disclosed network node 100 comprises a transmitter 102 and a first receiver 104 that are used by a controller 108 of the disclosed node 100 to maintain participation of the disclosed node 100 in the first TDMA network. The disclosed node 100 further comprises a second receiver 106 that is used by the controller 108 to detect and characterize the second TDMA network. In the illustrated embodiment, the TDMA networks are wireless networks, and the disclosed node 100 further comprises an antenna 110 that is used for wireless communication with other nodes.

According to the present disclosure, the controller 108 directs the second receiver 106 to listen for, receive, and recognize a network characteristic message that is transmitted by the second TDMA network, whereupon the disclosed node 100 reports detection of the second TDMA network. In embodiments, the received network characteristic message is interpreted by the disclosed node, and in some embodiments an approximate estimate of the timing offset between the network time references of the two TDMA networks is determined by the disclosed node according to the time at which the network characteristic message was received from the second TDMA network, and/or an identity of the second TDMA network is determined by the disclosed node according to the received network characteristic message.

In embodiments where the two TDMA networks transmit identical network characteristic messages, for example if the two networks implement identical TDMA architectures, the controller 108 instructs the second receiver 106 to suspend its listening function during the timeslot when the first TDMA network is transmitting the network characteristic message, so that the network characteristic message that is transmitted by the first TDMA network is not mistakenly received by the second receiver 106 and interpreted as a detection of the second TDMA network.

In embodiments, the network characteristic message is a "join message." In TDMA networks, a join message is a message that is transmitted periodically in specified "network entry" timeslots. This enables a node that does not have an accurate estimate of network time reference to "listen" for the transmission of the next join message, and then to join the network and synchronize its internal time base with the network time reference by receiving and responding to the join message.

Figure 2:
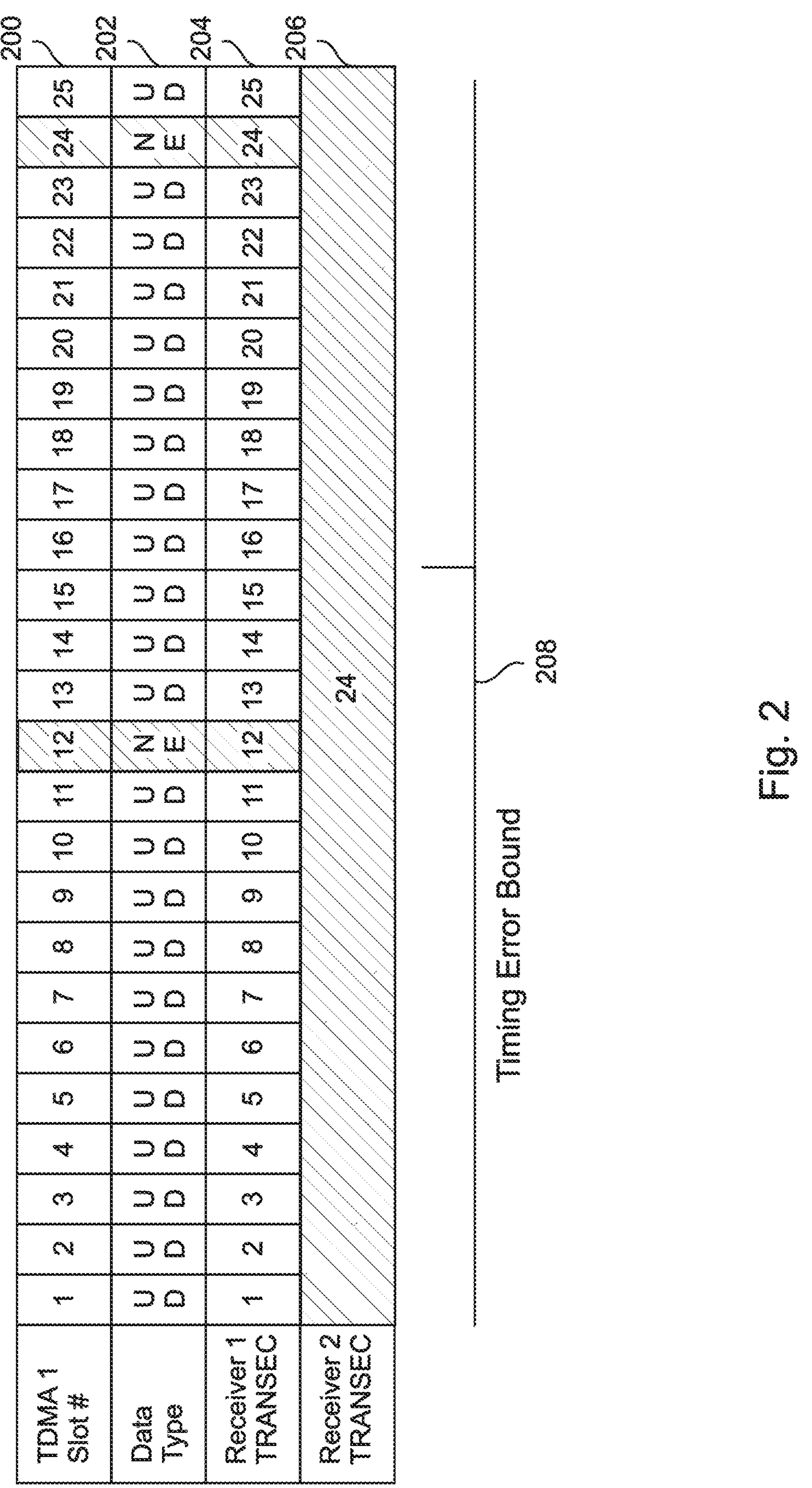
FIG. 2 is a timing chart that illustrates activities of the two receivers of the node of FIG. 1 when the network characteristic message of the second TDMA network is not detected by the second receiver, according to an embodiment of the present disclosure.

An exemplary embodiment of the present disclosure is illustrated by tables presented in FIGS. 2 and 3, in which it is assumed that the first and second TDMA networks implement the same TDMA protocol and architecture, such that they differ from each other only due to a relative time drift between their respective network time references, as would be the case for a "split" TDMA network. In the exemplary embodiment, each TDMA frame consists of 12 timeslots, and a network entry timeslot occurs as the last timeslot of each frame.

In the table of FIG. 2, the TDMA timeslot numbers of the first TDMA network are indicated in the first row 200. The data type that is assigned to each timeslot is indicated in the second row 202, where "UD" refers to "user data," and NE refers to "network entry." According to the network protocol that is implemented by both of the first and second TDMA networks, a "join" message is transmitted during each NE timeslot.

A transmission security (TRANSEC) feature, such as frequency "hopping" of the time slots (for wireless nodes) and/or application of pseudo-random noise, is implemented by the first and second TDMA networks in the exemplary embodiment, according to which a unique TRANSEC filter is designated for each timeslot, as is indicated by the third row 204 of the table in FIG. 2, where the TRANSEC filters are unique for each timeslot over long periods of very many frames. Due to the TRANSEC feature, recognition and interpretation of data transmitted within a timeslot is prevented unless the specific TRANSEC filter that is assigned to that timeslot is applied.

Accordingly, each of the NE join messages will be transmitted using a different TRANSEC filter. In particular, the TRANSEC filters for timeslots 12 and 24 will be different. Detection, recognition, and interpretation of any transmitted data, including the join messages of the NE timeslots, thereby requires application of the unique TRANSEC filter that has been assigned to that specific timeslot.

In the exemplary embodiment, the network time references of the TDMA networks were both initially synchronized with each other, such that they shared a common network time reference. However, over time, the network time references of the two TDMA networks have drifted away from mutual synchronization. Nevertheless, at any given time, the disclosed node 100 is able to estimate a maximum relative drift of each of the network time references away from the common network time reference, and to thereby estimate a timing "error bound" 208 that attempts to predict a maximum timing difference between the network time references of the two TDMA networks. In FIG. 2, the estimated timing error bound 208 is equal to 15 timeslots. Accordingly, in the illustrated example it is estimated that the network time reference of the second TDMA could be ahead of, or behind, the network time reference of the first TDMA network by as much as 15 timeslots.

According to the present disclosure, if the second TDMA network architecture comprises at least one TRANSEC feature, which is known to the disclosed node 100, the disclosed node 100 directs the second receiver 106 to apply to all received signals the TRANSEC filter that will be used by the second TDMA network to transmit a network characteristic message that is predicted to be transmitted by the second TDMA network at a time that lies far enough in the future to be beyond the estimated timing error bound 208, and is therefore unlikely to have already occurred. In FIG. 2, at the beginning of timeslot 1, the next join message for the first TDMA network is expected in timeslot 12. However, since the estimated timing error bound 208 equals 15 timeslots, it is possible that timeslot 12 of the second TDMA network may have already occurred.

Accordingly, at the beginning of timeslot 1, the controller 108 in the illustrated example instructs the second receiver 106 to apply to all received signals the TRANSEC filter 206 for timeslot 24 of the second TDMA network, which is predicted to lie in the future, rather than for timeslot 12, which may already be in the past. More specifically, due to the timing error bound 208 of 15 timeslots, timeslot 24 of the second TDMA network is expected to occur at any time between timeslot 9 (=24−15) and timeslot 39 (=24+15, not shown) of the first TDMA network.

The first TDMA network will fail to detect the second TDMA network under conditions where the two networks are "out of range" of each other, i.e. conditions wherein the first TDMA network is not yet able to detect messages transmitted by the second TDMA network. In the case of wireless TDMA networks, such "out of range" conditions can arise, for example, due to a physical separation between the two TDMA networks that is too great to enable intercommunication, and/or due to a lack of "line of sight" positioning of the two TDMA networks. The first TDMA network may also fail to detect the second TDMA network if the timing error bound 208 has been underestimated.

If the maximum wait time expires, which in FIG. 2 would occur at the end of timeslot 39 (not shown), and the network characteristic message of the second TDMA network, which in the illustrated embodiment is the join message of timeslot 24, has not yet been received, then the controller 108 instructs the second receiver 106 to implement the TRANSEC filter for a characteristic message that will be transmitted by the second TDMA network further in the future, which in the illustrated example is timeslot 36, and to continue listening. In embodiments. the controller 108 also increases the estimated timing error bound 208, under the assumption that the timing error bound 208 may have been underestimated.

FIG. 3 presents a table that illustrates detection of the second TDMA network by the first TDMA network, according to the exemplary embodiment of FIG. 2, but under conditions where the two TDMA networks are in range of each other, and the timing error bound 208 has not been overestimated. In FIG. 3, the time slot assignments 200, data types 202 and first receiver TRANSEC filter assignments 204 for the first TDMA network are identical to FIG. 2. However, the timeslot numbers and boundaries of the second TDMA network 300 are included in the table, because the second TDMA network is in range and available for detection by the disclosed node 100. It can be seen in the table that the network time references of the two TDMA networks have drifted apart from each other, in this example, such that the network time reference of the second TDMA network "leads" the network time reference of the first TDMA network according to a timing error that is equal to 5 timeslots, plus an additional fraction of a timeslot $t_f$.

Accordingly, as can be seen in FIG. 3, the network characteristic message, i.e. the join message of timeslot 24 of the second TDMA network, is detected by the second receiver 106 of the disclosed node 100 during timeslots 17 and 18 of the first TDMA network. The controller 108 thereby determines that the second TDMA network has been detected, and estimates that the timing error between the two network time references is approximately equal to 5 timeslots plus $t_f$.

In the exemplary embodiment, when the join message of the second TDMA network is detected and recognized by the disclosed node 100, the controller 108 causes the second receiver 106 to be approximately time-synchronized to the second TDMA network 302, according to the time at which the network characteristic message from the second TDMA network was received ($t_r$ after timeslot 16). The time synchronization is initially approximate, in that a transmission time lag between the two networks, and possibly other factors, are not yet known. In some embodiments, the disclosed node 100 causes the transmitter 104 to transmit a message to the second TDMA network requesting more accurate timing information, such as round-trip timing (RTT) information, whereby the time-synchronization of the second receiver 106 with the second TDMA network is improved.

While the first and second TDMA networks implement the same TDMA protocol and architecture in the exemplary embodiment of FIGS. 2 and 3, it will be understood that, in other embodiments, the second TDMA network implements a network protocol and architecture that are known to the first TDMA network, including any applicable TRANSEC filters, but differs from the network protocol and/or architecture of the first TDMA network.

Figure 4:
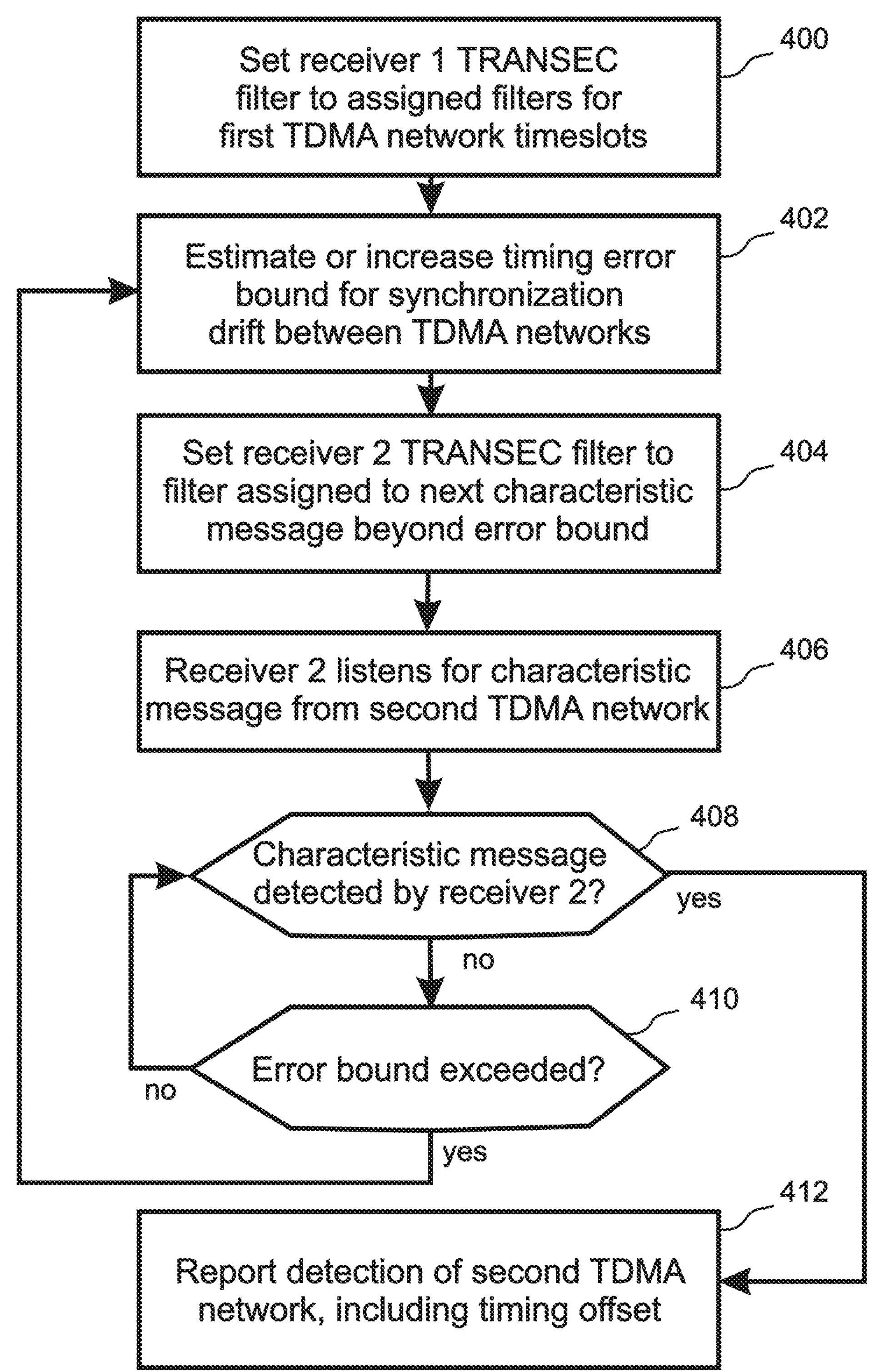
FIG. 4 is a flow diagram that illustrates a method embodiment of the present disclosure.

FIG. 4 illustrates steps that the controller 108 is configured to carry out in embodiments of the present disclosure. Specifically, the controller 108 participates in the first TDMA network by instructing the first receiver 104 to apply TRANSEC filters 400 according to the timeslots of the first TDMA network. According to known precisions of the network time references of the first and second TDMA networks, and according to the elapsed time since the two TDMA networks were synchronized to each other, the controller 108 estimates 402 a timing error bound representing a maximum predicted leading or lagging time difference that could potentially exist between the two network time references.

The controller 108 then determines the next timeslot of the second TDMA network that is expected to lie in the future, according to the estimated timing error bound, and causes the second receiver 106 to implement the TRANSEC filter for that timeslot 404, and to listen 406 for the expected network characteristic message, which in the illustrated embodiment is a join message. If the join message is detected and recognized 408 by the second receiver 106, then detection of the second TDMA network is reported 412, together with the approximate timing offset between the two TDMA network time references, and any other characteristics of the second TDMA network that can be derived from the received network characteristic message.

Otherwise, if the timing error bound has not been exceeded 410, the second receiver 106 continues to listen for the join message from the second TDMA network without changing the applied TRANSEC filter. Once the error bound has been exceeded 410, if the characteristic message of the second TDMA network has not been detected and recognized, the controller 108 updates the applicable timing error bound and causes the second receiver 106 to implement the TRANSEC filter for a timeslot of the second TDMA network that is expected to lie further in the future, and to continue listening 406 for the expected network characteristic message. In embodiments, the controller may increase the estimated timing error bound 402, under the assumption that the timing error bound may have previously been underestimated.

In embodiments, once the network characteristic message from the second TDMA network is received and recognized 408 by the disclosed node 100, the disclosed node 100 informs a user and/or a network controller that the second TDMA network is present, together with an estimated timing offset between the network time references of the two TDMA networks, and any other information that the disclosed node is able to derive from the received network characteristic message. By monitoring the timing of future network characteristic messages received from the second TDMA network, in embodiments the disclosed node 100 is also able to estimate a timing rate difference, i.e. a "clock rate" difference, between the network time references of the two TDMA networks. In certain embodiments, the detection, recognition, and characterization of the second TDMA network is used to enable communication between the two TDMA networks, and/or merger of the two TDMA networks into a single TDMA network.

In various embodiments, the network architecture for at least one of the TDMA networks is a LINK 16 architecture. In some of these embodiments, if the network architecture for both of the TDMA networks is a LINK 16 architecture, then upon detecting and recognizing a characteristic message such as a join message transmitted by the second TDMA network during one of its network entry (NE) timeslots, the disclosed node 100 transmits a Round-Trip Timing (RTT) synchronization request to the second TDMA network during one of the RTT timeslots of the second TDMA network, and receives a responding observation, thereby improving the estimation of the timing offset between the network time references of the two TDMA networks.

Embodiments of the present disclosure are applicable to wireless TDMA networks implemented by two associated groups of nodes that are initially unable to intercommunicate, but are later able to intercommunicate, such as two flights of aircraft originating from different locations and flying to a common destination, or a flight of aircraft traveling toward an initially distant grouping of ground-based and/or sea-based assets. In such cases, the two TDMA networks may be initially synchronized with each other by wired communication before the aircraft have begun their flights, but may afterward drift out of synchronization with each other while the aircraft are airborne, until such time as the two TDMA networks are able to intercommunicate wirelessly and detect each other as described herein.

Figure 5:
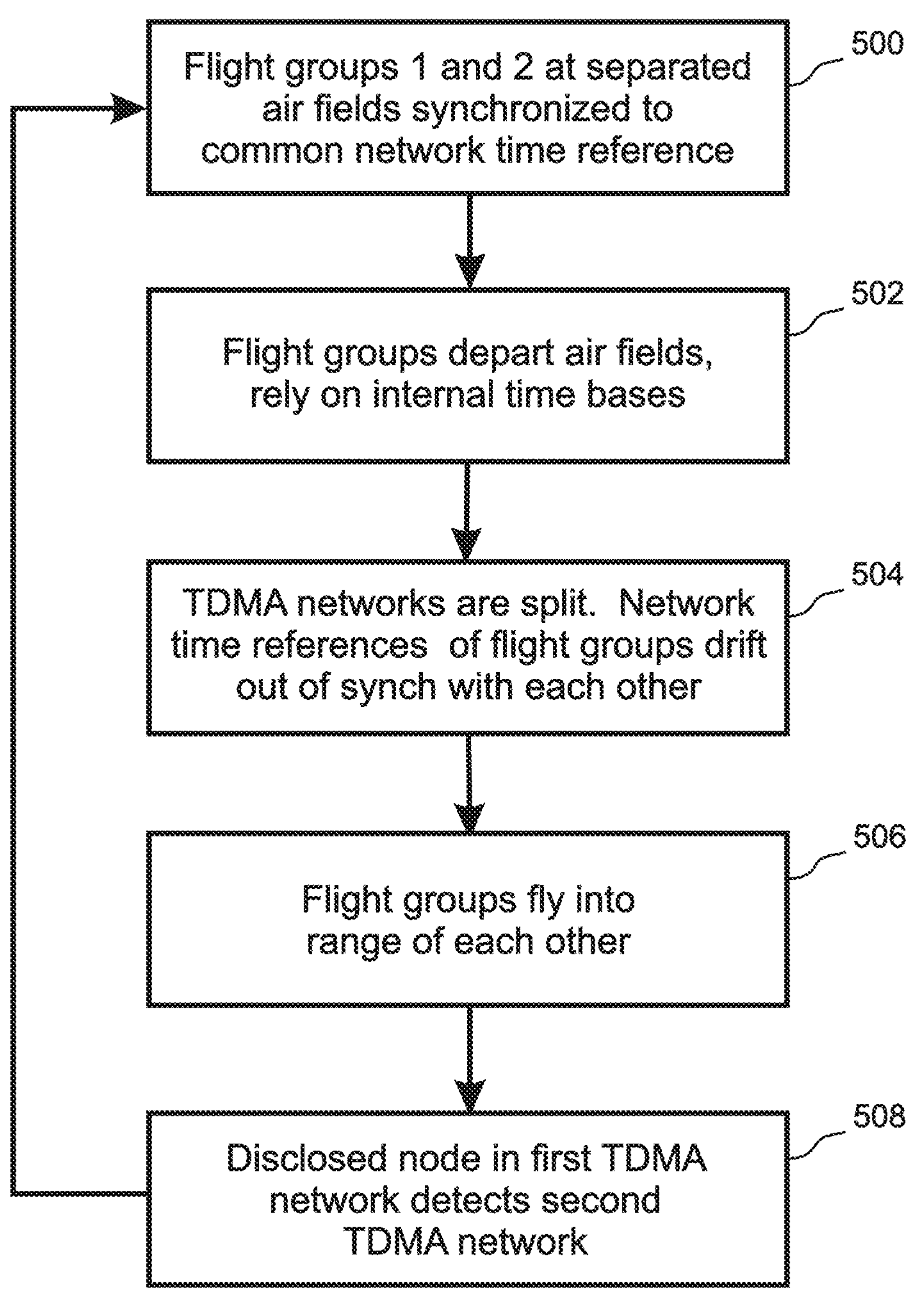
FIG. 5 is a flow diagram that illustrates a scenario to which embodiments of the present disclosure would be applicable.

For example, with reference to FIG. 5, two flight groups that are initially located at two physically separated airfields may initially be synchronized 500 to each other, for example by wired communication between the two airfields, by detection of GPS signals, or by some other mechanism. As such, a common TDMA network may be initially established for the two flights of aircraft. However, if the two flights of aircraft are initially unable to communicate wirelessly with each other once they have departed from their respective airfields, for example due to physical separation and/or due to a lack of line-of-sight positioning, and if the flight groups are flying through areas where no external common time reference is available, for example if they are not able to receive GPS signals, then each of the flight groups may be required to maintain its network time reference based on the internal time bases 502 of one or more of its nodes. As a result, the TDMA network that was initially established can split into two TDMA networks 504 according to a timing drift between the network time references of the two flights of aircraft.

Once the two flights of aircraft have traveled into mutual proximity, such that they are "in range" of each other 506, the network node 100 of the first TDMA network, as disclosed herein, is able to detect 508 the second TDMA network, after which the two networks can be reconfigured and recombined into a single TDMA network.

The foregoing description of the embodiments of the disclosure has been presented for the purposes of illustration and description. Each and every page of this submission, and all contents thereon, however characterized, identified, or numbered, is considered a substantive part of this application for all purposes, irrespective of form or placement within the application. This specification is not intended to be exhaustive or to limit the disclosure to the precise form disclosed. Many modifications and variations are possible in light of this disclosure.

Although the present application is shown in a limited number of forms, the scope of the disclosure is not limited to just these forms, but is amenable to various changes and modifications. The present application does not explicitly recite all possible combinations of features that fall within the scope of the disclosure. The features disclosed herein for the various embodiments can generally be interchanged and combined into any combinations that are not self-contradictory without departing from the scope of the disclosure. In particular, the limitations presented in dependent claims below can be combined with their corresponding independent claims in any number and in any order without departing from the scope of this disclosure, unless the dependent claims are logically incompatible with each other.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of technology disclosed herein may be implemented using hardware, software, or a combination thereof. When implemented in software, the software code or instructions can be executed on any suitable processor or collection of processors, whether provided in a single computer or distributed among multiple computers. Furthermore, the instructions or software code can be stored in at least one non-transitory computer readable storage medium.

Also, a computer or smartphone may be utilized to execute the software code or instructions via its processors may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers or smartphones may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software/instructions that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, USB flash drives, SD cards, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" or "instructions" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments. As such, one aspect or embodiment of the present disclosure may be a computer program product including least one non-transitory computer readable storage medium in operative communication with a processor, the storage medium having instructions stored thereon that, when executed by the processor, implement a method or process described herein, wherein the instructions comprise the steps to perform the method(s) or process(es) detailed herein.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

All definitions, as defined and used herein, should be understood to control over dictionary definitions, definitions in documents incorporated by reference, and/or ordinary meanings of the defined terms.

"Logic", as used herein, includes but is not limited to hardware, firmware, software, and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results. Further, portions or all of the present disclosure may rely on underlying equations that are derived from the specific arrangement of the equipment or components as recited herein. Thus, portions of the present disclosure as it relates to the specific arrangement of the components are not directed to abstract ideas. Furthermore, the present disclosure and the appended claims present teachings that involve more than performance of well-understood, routine, and conventional activities previously known to the industry. In some of the method or process of the present disclosure, which may incorporate some aspects of natural phenomenon, the process or method steps are additional features that are new and useful.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

While components of the present disclosure are described herein in relation to each other, it is possible for one of the components disclosed herein to include inventive subject matter, if claimed alone or used alone. In keeping with the above example, if the disclosed embodiments teach the features of components A and B, then there may be inventive subject matter in the combination of A and B, A alone, or B alone, unless otherwise stated herein.

As used herein in the specification and in the claims, the term "effecting" or a phrase or claim element beginning with the term "effecting" should be understood to mean to cause something to happen or to bring something about. For example, effecting an event to occur may be caused by actions of a first party even though a second party actually performed the event or had the event occur to the second party. Stated otherwise, effecting refers to one party giving another party the tools, objects, or resources to cause an event to occur. Thus, in this example a claim element of "effecting an event to occur" would mean that a first party is giving a second party the tools or resources needed for the second party to perform the event, however the affirmative single action is the responsibility of the first party to provide the tools or resources to cause said event to occur.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

To the extent that the present disclosure has utilized the term "invention" in various titles or sections of this specification, this term was included as required by the formatting requirements of word document submissions pursuant the guidelines/requirements of the United States Patent and Trademark Office and shall not, in any manner, be considered a disavowal of any subject matter.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed is:

1. A node of a first TDMA network, the node comprising:

a transmitter;

a first receiver;

a second receiver;

a first internal time base; and a controller;

wherein the controller is configured to:

synchronize the first internal time base with a first network time reference of the first TDMA network;

cause the transmitter and the first receiver to participate in the first TDMA network;

cause the second receiver to await reception of a second TDMA network characteristic message transmitted by a second TDMA network implementing a TDMA protocol and architecture that are known to the controller, the second TDMA network comprising a second network time reference, wherein a timing offset exists between the first and second network time references, said timing offset being initially unknown to the controller; and upon said receiving by the second receiver of the second TDMA network characteristic message transmitted by the second TDMA network, and upon recognition and interpretation thereof, report detection of the second TDMA network;

wherein the controller is further configured to cause the second receiver to suspend awaiting reception of the second TDMA network characteristic message during a timeslot in which the first TDMA network is transmitting a first TDMA network characteristic message that is identical to the second TDMA network characteristic message.

2. The node of claim 1, wherein the TDMA protocol and architecture that are implemented by the second TDMA network are also implemented by the first TDMA network.

3. The node of claim 1, wherein the second TDMA network characteristic message is a join message transmitted by the second TDMA network during a network entry timeslot thereof.

4. The node of claim 1, wherein an identity of the second TDMA network is determined by the node according to the received second TDMA network characteristic message.

5. The node of claim 1, wherein the controller is further configured to determine an estimated timing offset between the first and second network time references according to a time at which the second TDMA network characteristic message is detected by the second receiver.

6. The node of claim 5, wherein, upon said receiving by the second receiver of the second TDMA network characteristic message transmitted by the second TDMA network, and upon said recognition and interpretation thereof, the controller is further configured to join the second TDMA network by directing the transmitter and the second receiver to exchange data with the second TDMA network, thereby causing the node to concurrently participate in both of the first and second TDMA networks.

7. The node of claim 5, wherein the controller is further configured to improve an accuracy of the estimated timing offset by transmitting a timing update request to the second TDMA network, and by receiving from the second TDMA network a timing update response.

8. The node of claim 7, wherein:

the TDMA protocol and architecture that are implemented by the second TDMA network is a Link 16 protocol and architecture;

the timing update request is a roundtrip timing (RTT) request transmitted in an RTT timeslot of the second TDMA network; and the timing update response is an RTT observation.

9. The node of claim 5, wherein the second TDMA network characteristic message is a first network characteristic message of a plurality of spaced-apart network characteristic messages transmitted by the second TDMA network, and wherein the controller is further configured to:

cause the second receiver to receive a second network characteristic message of the plurality of spaced-apart network characteristic messages; and estimate a timing rate difference between the first network time reference and the second network time reference according to a difference between an expected time separation between the receiving of the first and second network characteristic messages and an actual time separation between the receiving of the first and second network characteristic messages.

10. The node of claim 1, wherein:

said interpretation of the second TDMA network characteristic message requires application thereto of a TRANSEC filter that is associated with a specific timeslot of the second TDMA network in which the network characteristic message was transmitted, said TRANSEC filter being known to the controller;

the controller is further configured, before the second TDMA network characteristic message is received by the second receiver, to estimate a timing error bound representing an approximate maximum timing offset between the first and second network time references, according to a time that has elapsed since a mutual synchronization of the first and second network time references with each other, and according to known timing precisions of the first and second network time references; and the controller is configured to select the specific timeslot as being a timeslot of the second TDMA network that, according to the estimated timing error bound, is predicted to occur in the future.

11. The node of claim 10, wherein said mutual synchronization of the first and second network time references with each other comprises synchronization of each of the first and second network time references with an external common time reference.

12. The node of claim 10, wherein the controller is further configured to:

determine a maximum wait time according to the estimated timing error bound; and if the maximum wait time is reached and the second TDMA network characteristic message has not been received, select a subsequent specific timeslot as being a timeslot of the second TDMA network that, according to the estimated timing error bound, is expected to occur in the future.

13. The node of claim 10, wherein if the maximum wait time is reached and the second TDMA network characteristic message has not been received, the controller is further configured to increase the estimated timing error bound.

14. The node of claim 1, wherein reporting the detection of the second TDMA network comprises at least one of reporting the detection of the second TDMA network to a user and reporting the detection of the second TDMA network to a network controller.

15. Non-transient media containing instructions that are executable by a controller of a node of a first TDMA network, said instructions being configured, when executed by the controller, to cause the controller to execute steps comprising:

synchronizing the first internal time base of the node with a network time reference of the first TDMA network;

causing a transmitter and a first receiver of the node to participate in the first TDMA network;

causing a second receiver of the node to await reception of a second TDMA network characteristic message transmitted by a second TDMA network implementing a TDMA protocol and architecture that are known to the controller, the second TDMA network comprising a second network time reference, wherein a timing offset exists between the first and second network time references, said timing offset being initially unknown to the controller;

upon receiving, recognizing and interpreting by the second receiver of the second TDMA network characteristic message transmitted by the second TDMA network, and upon recognition and interpretation thereof, reporting a detection of the second TDMA network;

wherein the second TDMA network characteristic message is a first network characteristic message of a plurality of spaced-apart network characteristic messages transmitted by the second TDMA network, and wherein the instructions are further configured to cause the controller to:

cause the second receiver to receive a second network characteristic message of the plurality of spaced-apart network characteristic messages; and estimate a timing rate difference between the first and second network timing references according to a difference between an expected time separation between the receiving of the first and second network characteristic messages and an actual time separation between the receiving of the first and second network characteristic messages.

16. The non-transient media of claim 15, wherein the instructions are further configured to cause the controller to determine an estimated timing offset between the first and second network time references according to a time at which the second TDMA network characteristic message is detected by the second receiver.

17. The non-transient media of claim 7, wherein:

said interpretating of the network characteristic message transmitted by the second TDMA network requires application thereto of a TRANSEC filter that is associated with a specific timeslot of the second TDMA network in which the network characteristic message was transmitted, said TRANSEC filter being known to the controller;

the instructions are further configured to cause the controller, before the second TDMA network characteristic message is received by the second receiver, to estimate a timing error bound representing a maximum timing offset between the first and second network time references, according to a time that has elapsed since a mutual synchronization of the first and second network time references with each other, and according to known timing precisions of the first and second network time references; and select as the specific timeslot a timeslot of the second TDMA network that, according to the estimated timing error bound, is expected to occur in the future.

18. The non-transient media of claim 17, wherein the instructions are further configured to cause the controller to:

determine a maximum wait time according to the estimated timing error bound; and if the maximum wait time is reached and the second TDMA network characteristic message has not been received, select a subsequent specific timeslot as being a timeslot of the second TDMA network that, according to the estimated timing error bound, is expected to occur in the future.

* * * * *